United States Patent [19]

Gibson

[11] Patent Number: 4,527,820
[45] Date of Patent: Jul. 9, 1985

[54] POSTIVE SEAL STEEL COUPLING APPARATUS AND METHOD

[76] Inventor: Jack E. Gibson, 4905 Pepperidge Pl., Odessa, Tex. 79761

[21] Appl. No.: 450,033

[22] Filed: Mar. 14, 1983

[51] Int. Cl.³ .............................................. F16L 13/14
[52] U.S. Cl. ................................ 285/382.2; 285/369; 285/417
[58] Field of Search ...................... 285/382.2, 55, 383, 285/369, 40, DIG. 16, 202, 423, 417; 29/525

[56] References Cited

U.S. PATENT DOCUMENTS

| | | | |
|---|---|---|---|
| 2,967,067 | 1/1961 | Ginger | 285/399 |
| 3,453,006 | 7/1969 | Levake | 285/423 X |
| 3,558,164 | 1/1971 | Havell | 285/423 X |
| 3,588,132 | 6/1971 | Edmundgon | 285/DIG. 16 |
| 4,095,826 | 6/1978 | Borradori | 285/423 X |
| 4,107,452 | 8/1978 | Razvi | 285/423 X |
| 4,213,641 | 7/1980 | Bennett | 285/423 X |

Primary Examiner—Richard J. Scanlan, Jr.

Attorney, Agent, or Firm—Marcus L. Bates

[57] ABSTRACT

A pipeline is fabricated by forcing the end portions of joints of pipe telescopingly into a coupling member and into fluid tight relationship respective to one another. The coupling member is in the form of a sleeve having opposed cavities which receive adjacent marginal ends of the pipe joints therewith. Each marginal end of the pipe joint is forced into the cavity of the sleeve with great force such that the sleeve cavity holds the pipe ends together with a strong friction fit. Each cavity of a sleeve has a first maginal length with blades formed about the circumference thereof, and another marginal length with a resilient sealing member formed about the circumference thereof, so that both the blades and the seal member are deformed as one of the marginal pipe ends is forced thereinto, whereby the metal bladed part of the sleeve engages and rigidly holds the pipe respective to the sleeve, while the seal part of the sleeve prevents leakage of fluids therethrough.

13 Claims, 19 Drawing Figures

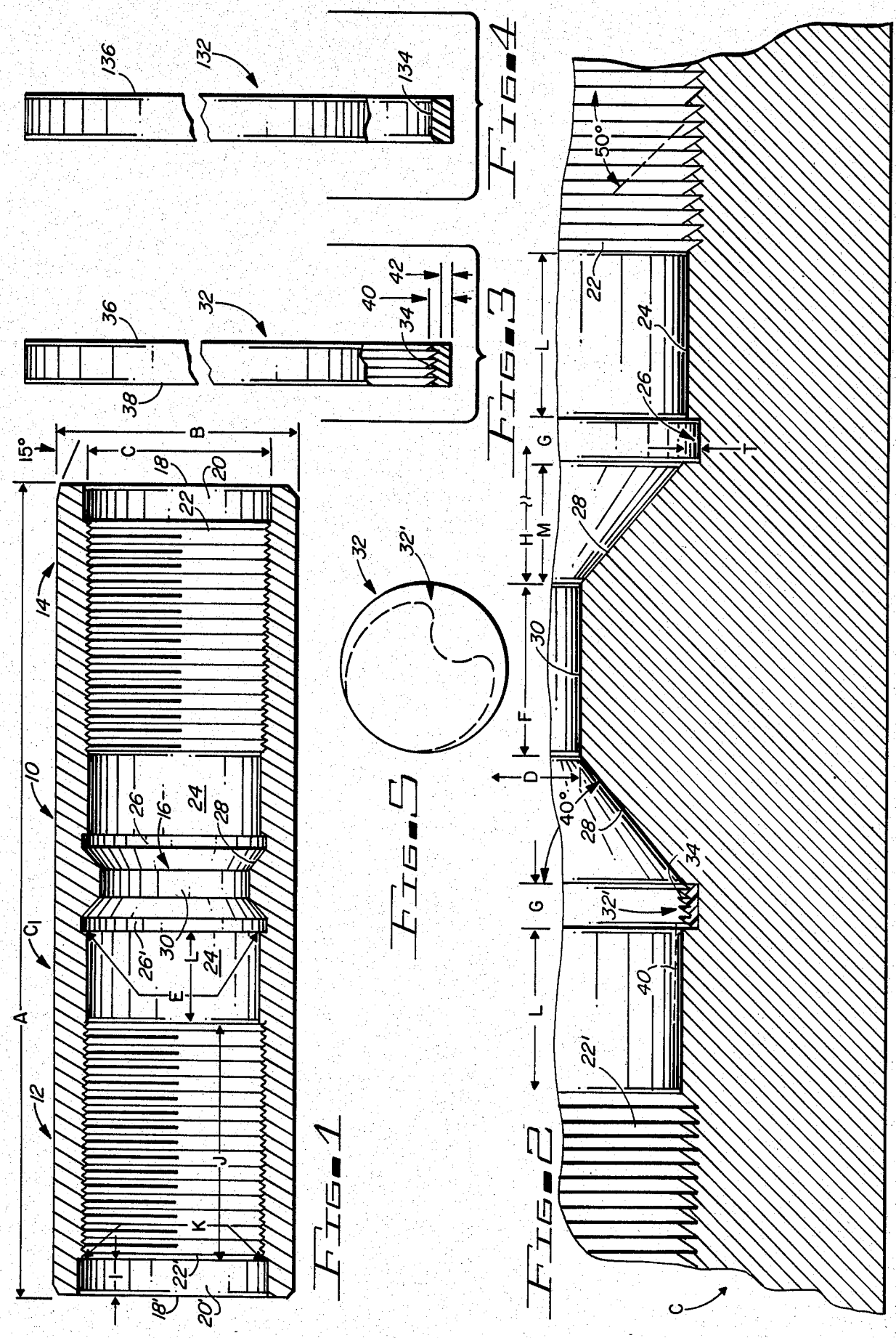

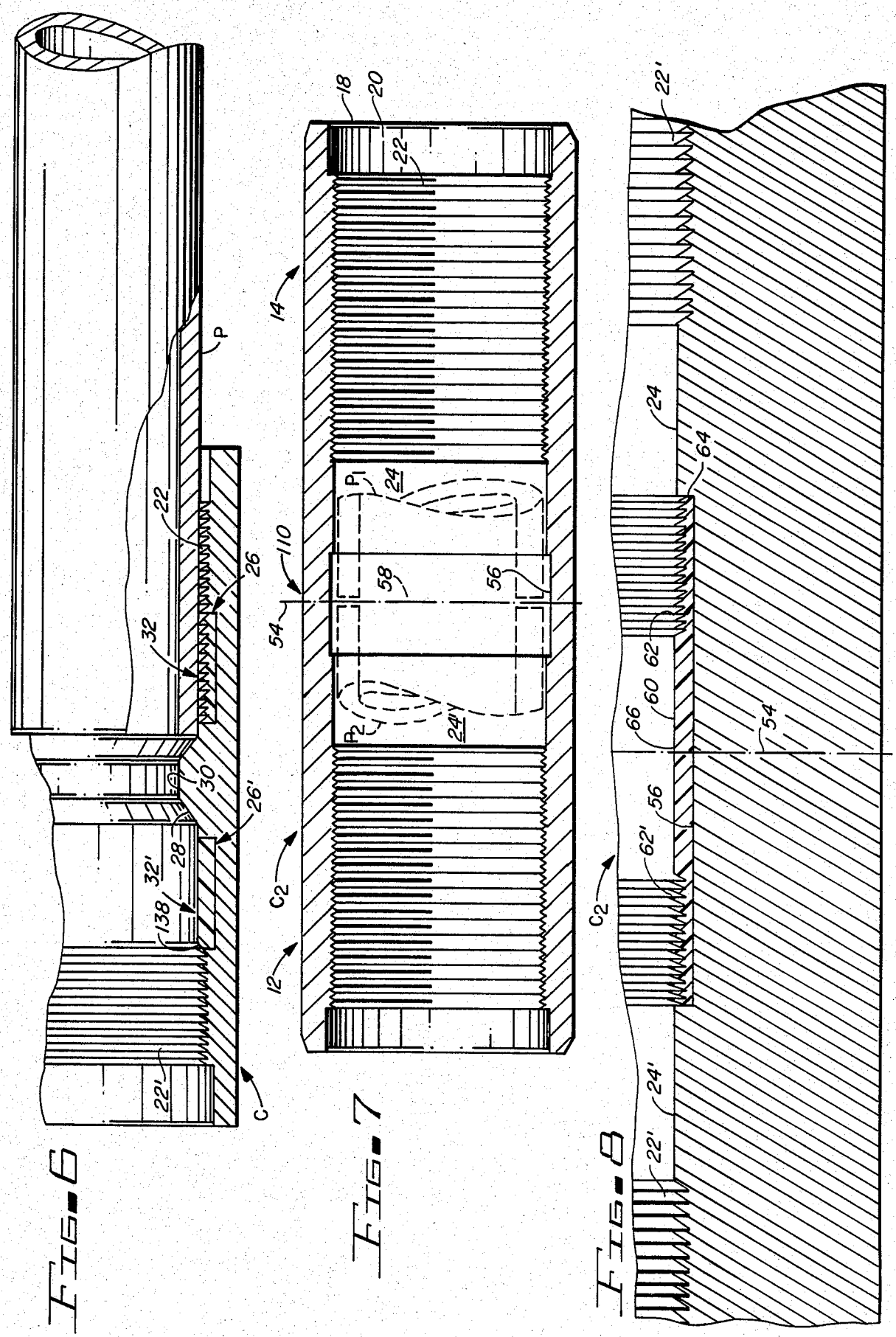

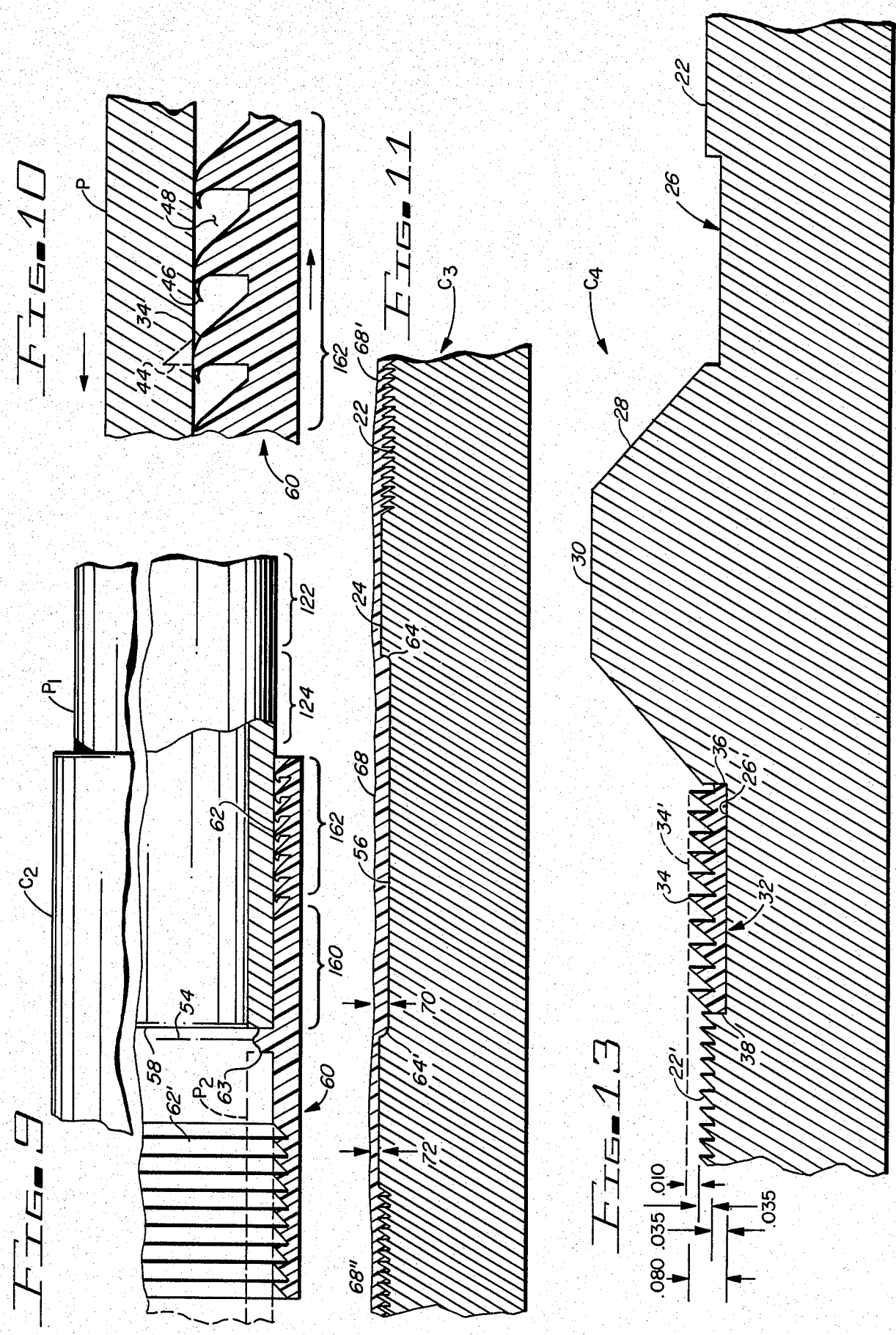

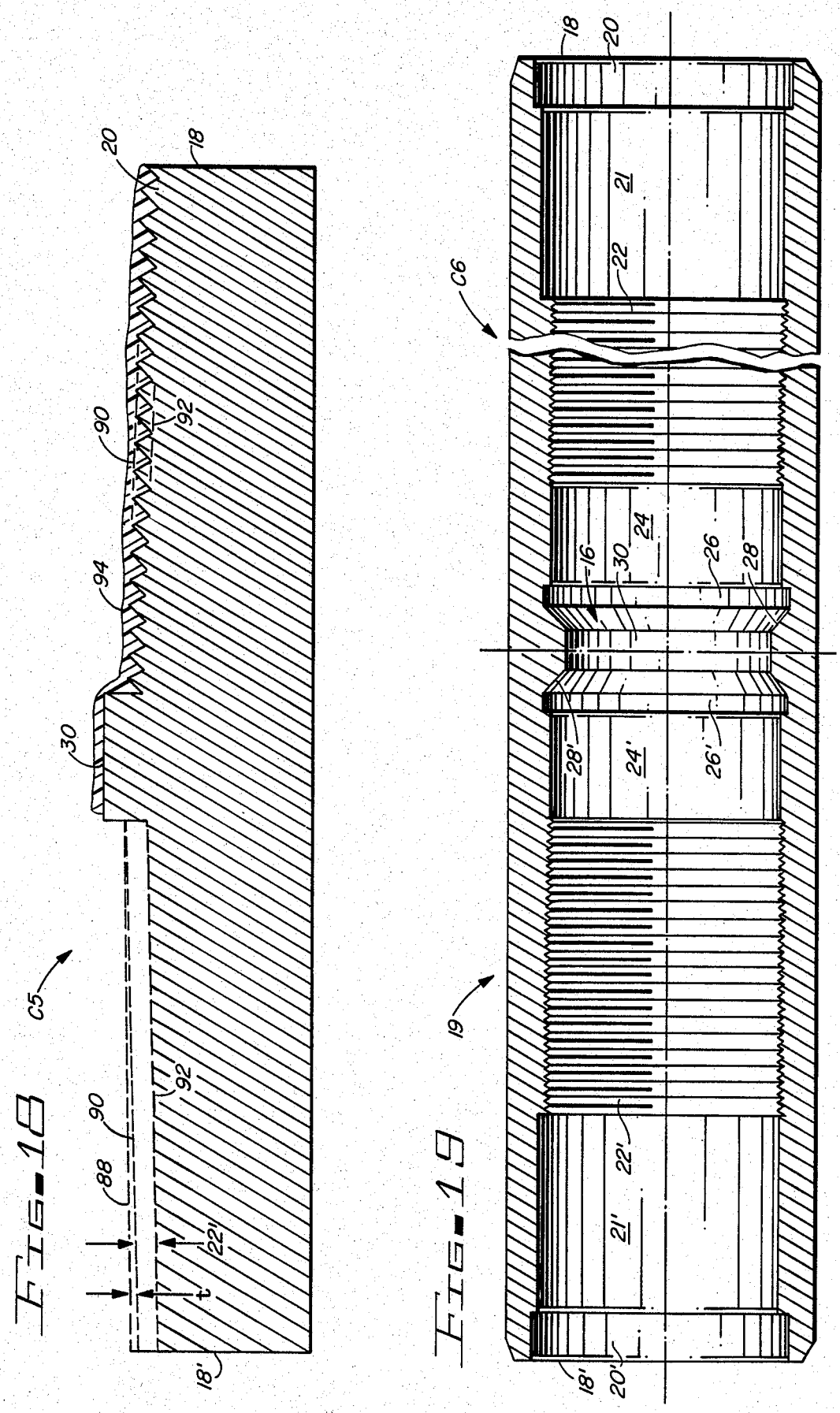

POSITIVE SEAL STEEL COUPLING APPARATUS AND METHOD

BACKGROUND OF THE INVENTION

This invention relates primarily to oilfield pipelines, although it is not limited to this particular field. Most oilfield pipelines employ tubular members constructed of steel and is usually referred to as seamless pressure tubing, line pipe, or standard tubing. There are many different ways in which the tubular members are joined to one another to effect a continuous fluid conducting pipeline of limitless length.

In the prior art, it is known to join tubular members by threadedly connecting the ends together by employment of tapered threaded connections which rely upon friction for a sealed fit. Repeated expansion and contraction of the pipeline has a deleterious effect upon this method of construction and ultimately causes the threads to stretch until leakage occurs at the threaded connections.

There is another widely used method of connecting tubular members together by the joining of two beveled opposed ends of pipe joints in a butt welded manner. However, the cost of labor and equipment required for this method is enormous.

Still others have proposed joining lengths of steel tubular goods together by a number of other different means, including the employment of grooved ends having gaskets and bolted couplers; the use of crimping tools; the application of interlocking tabs; as well as the use of o-rings and compression rings.

For example, Veitch, U.S. Pat. No. 2,498,831 connects plastic pipe together with a coupling member, and uses an adhesive as a sealing means between the marginal pipe end and the coupling member.

Reesor, U.S. Pat. No. 3,343,252 joins conduit together by employment of a knurling process along with an interlocking crimping process.

Curtin, U.S. Pat. No. 3,971,574 teaches that plastic pipe may be joined with a smooth fitted coupler, and includes an outside locking coupler.

Kyle, et al, U.S. Pat. No. 1,919,734; Carter U.S. Pat. No. 4,014,568; Bartholomew U.S. Pat. 3,997,195; Streit U.S. Pat. 4,002,358; Lowe U.S. Pat. No. 4,026,584; Asano U.S. Pat. No. 4,043,574; Martinez U.S. Pat. No. 4,076,285; Ramm U.S. Pat. No. 3,633,943; McGuire U.S. Pat. No. 3,701,548; Bingham U.S. Pat. No. 3,807,776; Frey U.S. Pat. No. 4,067,534; Wise U.S. Pat. No. 3,843,169; Garrett U.S. Pat. No. 3,565,468; and Singer U.S. Pat. No. 2,967,067 are other examples of the multitude of approaches to the problem of forming a continuous fluid conveying conduit from a plurality of pipe joints.

The closest art known to the present invention is applicant's previous U.S. Pat. Nos. 4,328,608 and 4,328,983; to which reference is made for further background of this invention.

The present invention constitutes a step forward over the above mentioned prior art by providing a fast, reliable, and inexpensive method and apparatus by which tubular goods are connected together into a continuous fluid conveying pipeline.

SUMMARY OF THE INVENTION

This invention relates to pipeline construction, and specifically to a method of joining the ends of pipe joints to a pipe coupling, or sleeve, to provide a new and unusual pipeline. A pair of pipe joints are arranged in spaced, confronting relationship respective to one another. The sleeve, which is to join the marginal ends of the adjacent pipe joints, has a pipe receiving socket formed within the opposed marginal ends thereof.

In one embodiment of the invention, each socket of the sleeve is divided into a smooth, pipe receiving portion, a grooved pipe receiving portion, and a bladed pipe receiving portion. A plastic seal of special construction is received within the groove for sealingly engaging the exterior of a marginal end of the pipe. The adjacent marginal ends of the pipe joints are forced through the smooth, bladed, and seal portions of the sockets, and towards one another. During this operation, the bladed area of the coupling deforms the metal on the outer peripheral wall surface of the marginal ends of the pipe joints, the smooth part of the socket rigidly holds the pipe in aligned relationship with the coupling, and the seal part of the socket prevents leakage of fluid therethrough, thereby providing a strong and leak proof mechanical connection.

In the preferred embodiment of the invention, the coupling has a plurality of cutter blades which are located internally of a smooth bore part thereof, and a toothed seal means is located within a circumferentially extending groove. The groove is located inwardly of the blades. The smooth bore receives the marginal terminal end of a pipe joint with a friction fit. As the adjacent pipe ends are forced into the socket of a sleeve, the pipe surface is wedgedly compressed by the smooth bore, is mechanically deformed and held by the cutter blades, and is sealingly engaged by the seal means.

Accordingly, a primary object of the present invention is the provision of a method by which pipe joints are joined together in the field by axially moving a pair of pipe joints towards one another and into a sleeve which frictionally engages the marginal ends of the pipe joints.

Another object of the present invention is the provision of a method of connecting adjacent ends of a threadless pipe joint by frictionally and sealingly engaging the marginal end of the pipe within a sleeve.

A further object of this invention is the provision of a method and apparatus by which the ends of pipe joints are joined together by forcing the marginal ends thereof into a coupling, where a resilient seal member and high frictional force holds the ends of the pipe joints within the sleeve.

A still further object of this invention is the provision of a method of connecting the marginal ends of pipe joints together by forming a socket and seal on one marginal end of a pipe joint and forcing another marginal pipe end into the socket and seal so that the pipe joints are held together by great friction.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a longitudinal, cross-sectional view of a pipe coupling made in accordance with the present invention;

FIG. 2 is an enlarged, fragmentary, cross-sectional view of part of the coupling member disclosed in FIG. 1;

FIGS. 3 and 4 are reduced, part cross-sectional, side elevational views of part of the apparatus disclosed in FIG. 2; with some parts being removed therefrom and some of the remaining parts being shown in cross-section;

FIG. 5 is a part diagrammatical, part schematical, end view illustrating the method of assembly of part of the present invention;

FIG. 6 is a broken, part cross-sectional side view of another embodiment of the present invention;

FIG. 7 is a longitudinal, cross-sectional view of another pipe coupling made in accordance with still another embodiment of the present invention;

FIG. 8 is an enlarged, fragmentary, cross-sectional view of part of the coupling apparatus disclosed in FIG. 7;

FIG. 9 is a broken, part cross-sectional side view illustrating the assembly of the apparatus seen in FIG. 8;

FIG. 10 is a further enlarged, detailed, cross-sectional view of part of the apparatus disclosed in FIG. 9;

FIG. 11 is a fragmentary, longitudinal, cross-sectional view which discloses part of another embodiment of the present invention;

FIG. 13 is a broken, longitudinal, cross-sectional view of another embodiment of the present invention;

FIG. 18 is a longitudinal, cross-sectional view of still another embodiment of the invention; and, FIG. 19 is a longitudinal, cross-sectional view of another embodiment of the present invention.

DETAILED DESCRIPTION OF THE PREFERRED EMBODIMENTS

Figure 12:
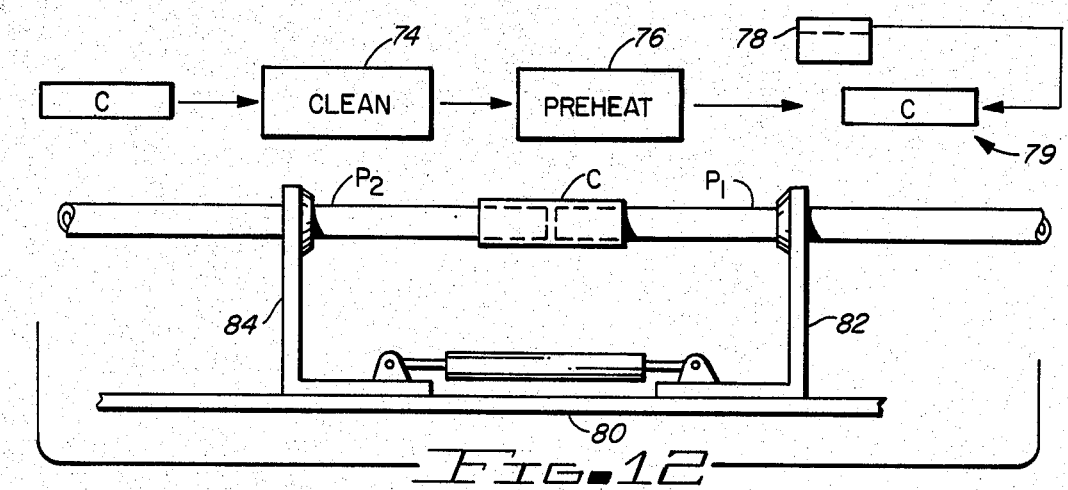
FIG. 12 is a flow sheet which schematically sets forth a method of the present invention.

In FIG. 1, together with FIGS. 2-6, there is disclosed a coupling C1 made in accordance with the present invention, by which pipe joints are joined together to form a pipeline. The coupling includes a unitary main body 10 having a marginal length 12 on the left hand side, a marginal length 14 on the right hand side, and a medial portion located between the left and right marginal lengths. The coupling terminates at opposed ends 18 and 18'. The coupling preferably includes diametrically opposed entrance sockets 20, 20' having an inside diameter of a size to freely accommodate the marginal end portion of a constant diameter seamless pipe to be telescopingly joined thereto. A multiplicity of cutter blades 22, also referred to as cutters, are formed from the rear of the outer socket 20 to the entrance of an inner socket 24. The cutters preferably have an inner diameter made smaller than the inner diameter of the outer socket, while the inner socket 24 preferably is of a diameter equal to or slightly less than the outside diameter of the marginal pipe end to be subsequently joined thereto.

A circumferentially extending, seal receiving groove 26 is formed adjacent to the innermost terminal end portion of the inner socket 24. The groove is formed at a location outwardly of an abut ment means 28, with the abutment means 28 preferably being in the form of an inwardly directed, sloped shoulder which terminates at a constant diameter land 30. The land 30 is formed in a plane located perpendicular to the longitudinal axis of the coupling and at the geometrical center of the coupling member. The construction of the left marginal portion 12 of the coupling 10 is identical to the construction of the right hand marginal portion of the coupling.

In one embodiment of the invention, the dimensions A–M as denoted in FIGS. 1 and 2 were selected to the following:

| | |
|---|---|
| A 9.000" ± .005" | H 4.312" ± .005" |
| B 2.875" ± .005" | I .375" ± .005" |
| C 2.410" ± .005" | J 3.000" ± .005" |
| D 2.000" ± 2.067" | K 2.355" ± .005" |
| E 2.330" ± .005" | L 1.000" ± .005" |
| F .375" ± .005" | M .187" ± .005" |
| G .125" ± .005" | |

FIG. 3 sets forth a specific plastic resilient seal member 32 having seal teeth 34 formed on the inner circumferentially extending wall thereof, with the teeth being oriented in the same direction of the blades 22 and 22' of FIGS. 1 and 2. The opposed ends 36, 38 of the seal member are made of a complementary size respective to the opposed sidewalls of the groove 26, so that the seal member is snuggly received within the seal receiving groove 26. The seal preferably is made of a resilient, durable plastic material, such as Nylon or Teflon (TM) for example.

The inside diameter of the seal teeth 24 preferably is several thousandths of an inch smaller as compared to the inside diameter of the cutter blades 22, 22'. The remaining body or thickness of the seal member is sufficient to maintain the structural integrity of the cutter blades during the assembly of the coupling member to the marginal pipe ends, and preferably is 0.010–0.035 inches.

In FIG. 4, the inside diameter 134 of the seal member 132 is essentially uninterrupted by seal teeth, and is provided with an inside diameter approximately 0.030–0.070 or 2 (0.015–0.035) inches smaller than the outside diameter of the marginal end of the pipe to be received therethrough. The entrance at 136 into the seal member is preferably curved or chamferred to more easily admit the pipe end to be forced therethrough.

FIG. 5 illustrates the manner in which the seal member 32 is assembled within the groove 26. The seal member 32, being larger in o.d. respective to the socket and teeth, must be deformed, as illustrated by the arrow at numeral 32', thereby effectively reducing the mean outside diameter to a value which enables the seal member to be telescopingly moved along the longitudinal axial centerline of the coupling member, and positioned in aligned relationship at the groove, whereupon the seal is forced back into a circular configuration, whereby the seal member is properly seated within the complementary fabricated seal receiving groove 26.

In the embodiment of FIG. 6, the seal member 32 extends from the innermost cutter blade 22, into proximity of shoulder 28 located at the medial portion of the coupling member. The seal member 32 is provided with a plurality of circumferentially extending seal teeth having an inside diameter slightly smaller than the inside diameter of the cutter blades 22.

The seal member 32' is devoid of teeth, and instead is provided with a smooth internal surface which is curved at 138 to more readily admit the pipe to be forcefully and telescopingly received therethrough. As another embodiment of the invention, the sealing surface 134 is tapered inwardly, commencing at 138 with a relatively large i.d., which is reduced several thousandths of an inch in diameter towards the other end 136. The end of pipe P is shown in abutting engagement with one of the shoulders 28, with the teeth of the seal member 32 being outwardly deformed and sealingly engaging the exterior surface of the near marginal end of the pipe. The metal cutter blades 22 are also deformed by the marginal external surface of the pipe, thereby rigidly holding the pipe respective to the coupling. For convenience, both embodiments 32 and 132 are shown in conjunction with the FIG. 6 seal grooves 26 and 26'.

FIG. 7 discloses another embodiment of the invention, comprising a coupling member C2 having an outer, relatively large inside diameter socket 20 spaced from an inner, relatively small inside diameter socket 24, with there being a multiplicity of cutter blades 22 formed along a marginal inner peripheral surface area of the coupling. A single elongated, or wide, seal receiving groove 56 is located at the geometrical center of the coupling, and extends from the innermost end of one socket 24 to the innermost end of another socket 24'.

The groove 56, in a manner similar to the previous embodiments of the invention, is of a suitable depth so that when opposed ends of pipes P1, P2 are telescopingly forced into the dot-dash position 58, the annulus formed between the exterior surface of the marginal pipe ends and the interior surface of the seal groove is of a size, or thickness, to tightly admit the presence of a seal member therein with the seal preferably being of a configuration such as previously exemplified in conjunction with FIGS. 3-6, 14, and 15.

The cutter blades 22 and the teeth of the seal are oriented in a direction towards the geometrical center 54 of the coupling, which also is equivalent to stating that the cutter blades and seal teeth are jointly oriented towards a medial portion of the coupling, or in a direction away from the pipe end yet to be received within the coupling.

As seen in FIG. 8, which discloses additional details of the coupling member C2, the seal member 60 is provided with seal teeth 62, 62' which are oriented towards one another and towards a plane passing perpendicularly through the geometric center 54 of the coupling. The cutter blades are similarly oriented.

In FIG. 9, the coupling member C2 and seal 60 of FIGS. 7 and 8 have been assembled, and the marginal ends of pipes P1 and P2 have been telescopingly forced into the coupling member, with a terminal end 58 of the pipe P1 being positioned in close proximity of the geometrical center 54. It is be noted that the plastic teeth at 62 have been deformed, along with some remaining plastic 63 located at the area which remains between the terminal ends 58 of the pipes P1 and P2.

The inner socket 24 (FIG. 8) is of a size to inwardly deform a marginal length of a pipe P1 (FIG. 9) when the pipe is forced therethrough. This deformation causes another marginal length at 162 of the pipe to be expanded outwardly. Hence, as seen in FIG. 9, there is an area 122 along the marginal length of pipe P1 which is firmly engaged and rigidly held by cutter blades so that the pipe is held with great force by the blades. Another area 124 along a marginal end of the pipe is tightly engaged and inwardly deformed by the inner socket 24. The compression at 124 is circumferentially exerted on the pipe in a radial and inward direction and causes area 160, 162 of pipe P1 to be outwardly belled or expanded. Expanded area 162 of the pipe is sealingly engaged with great force by the deformed resilient plastic teeth 62. The marginal terminal end 160 of the pipe P1 is engaged by the solid portion 60 of the seal.

In FIG. 10, the pipe P is shown as having been forced towards the left and through seal 60 of the coupling member C2. Numeral 162 indicates the outwardly deformed portion of the pipe P1 which is engaged by the deformed resilient seal teeth. Numeral 34 indicates one of the plurality of seal teeth which jointly make up the seal tooth area 162. Numeral 44 broadly illustrates the form of the individual seal teeth before they are deformed as seen at 46. Numeral 48 indicates the annular voids left between adjacent teeth.

The seal teeth in each embodiment of the present invention can be made into a continuous thread-like member which commences at a location near an outermost marginal end portion of the interior of the socket and continue uninterrupted to a location near the inner end thereof, with said inner end being located inwardly of the beginning of the thread-like seal tooth. Alternatively, the seal teeth can be a plurality of spaced, continuous, circumferentially extending teeth extending for exactly 360° about the inner periphery of the seal or member, with each tooth being independently spaced from one another. The term "plurality of teeth" or "multiplicity of teeth" is intended to mean that there are several thread-like seal teeth, each inclined towards a medial portion of the coupling, and when viewed in cross-section, and counted, there are a plurality or multiplicity of seal teeth.

FIG. 11 sets forth still another embodiment of the present invention, wherein a coupling C3 is provided with marginal opposed end portions similar to FIG. 7, for example, and further includes a relatively wide seal groove 56, which extends from 64 to 64'; and, is of a thickness indicated by the numeral 70. A coating 68 of thermal plastic material is included on the entire inner peripheral wall surface of the coupling and covers the cutter blades 22, 22' at 68', 68"; as well as covering or coating the inner socket 24 and outer socket (not shown). The thickness 72 of the coating is at least 0.010-0.035 inches.

The process by which the coupling C3 is internally coated is set forth in FIG. 12. As seen in FIG. 12, the coupling C, which has been completely machined, is cleaned at 74, preheated at 76 to a temperature above the melting or fusion temperature of the plastic coating 68 to be applied. The plastic coating preferably is powder epoxy resin identified as follows: Corvel 501 Powder; The Polymer Co., Reading, Pa.; or, M & T Powder, M & T Chemicals, N. Postoak Rd., Houston, Texas. A fluidized bed 78 provides a suitable source of the plastic material which is applied to the coupling at 79.

The coupling at 79 attains a uniform temperature of 420°–440° F., and is then filled with the powdered fluidized plastic from the fluidized bed for a short interval of time, whereupon the residual fluidized plastic is then expelled from the interior of the coupling, thereby leaving behind a plastic coated coupling. The coated coupling is cooled and thereafter used in building a pipeline by utilizing a hydraulically actuated pipe building machine 80, having movable arms 82 and 84. The free terminal ends of the arms 82 and 84 are provided with slips which releasably engage the marginal confronting ends of pipes P1, P2; with the coupling C being axially aligned therebetween. The pipe ends are forced to move axially into the coupling and towards one another, where the pipe ends come to rest in the illustrated manner of FIG. 9, for example. Reference is made to my previous U.S. Pat. Nos. 4,328,608 and 4,328,983 for further details of a machine for fabricating a pipeline using a coupling similar to the one disclosed herein.

Figure 14:
FIG. 14 is an isolated, detailed view of part of the apparatus disclosed in FIG. 13.
Figure 15:
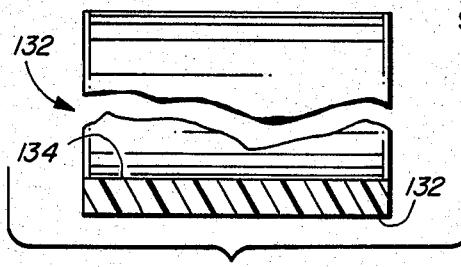
FIG. 15 is an isolated view of a modification of the apparatus disclosed in FIG. 14.

In FIGS. 13–15, a coupling C4 is provided with spaced seal receiving grooves 26 and 26'. As seen illustrated on the right hand side of the coupling at 22, the cutter blades have not yet been formed into the surface of the axial bore of the coupling. A cylinder 132 (FIG. 15), made complementary respective to the seal receiving groove 26, is properly positioned within each of the seal receiving grooves located on opposed sides of the annular land 30. The cutter blades and the seal teeth are substantially simultaneously formed within the axial bore in one operation; so that the resultant configuration of the cutter blades and seal teeth are continuous as illustrated at 22' and 34.

The inside diameter 134 of the plastic cylinder 132 preferably is smaller than the inside diameter of the axial bore at 22, so that the inside diameter of the resultant teeth at 34' is slightly smaller than the inside diameter of the cutter blades 22'. As seen in FIG. 13, the toothless plastic cylinder has a wall thickness of 0.080, which leaves a solid or unthreaded body portion of 0.035, with the teeth of the seal extending 0.010 inches beyond the cutter teeth, which are 0.035 inches in depth.

Figure 16:
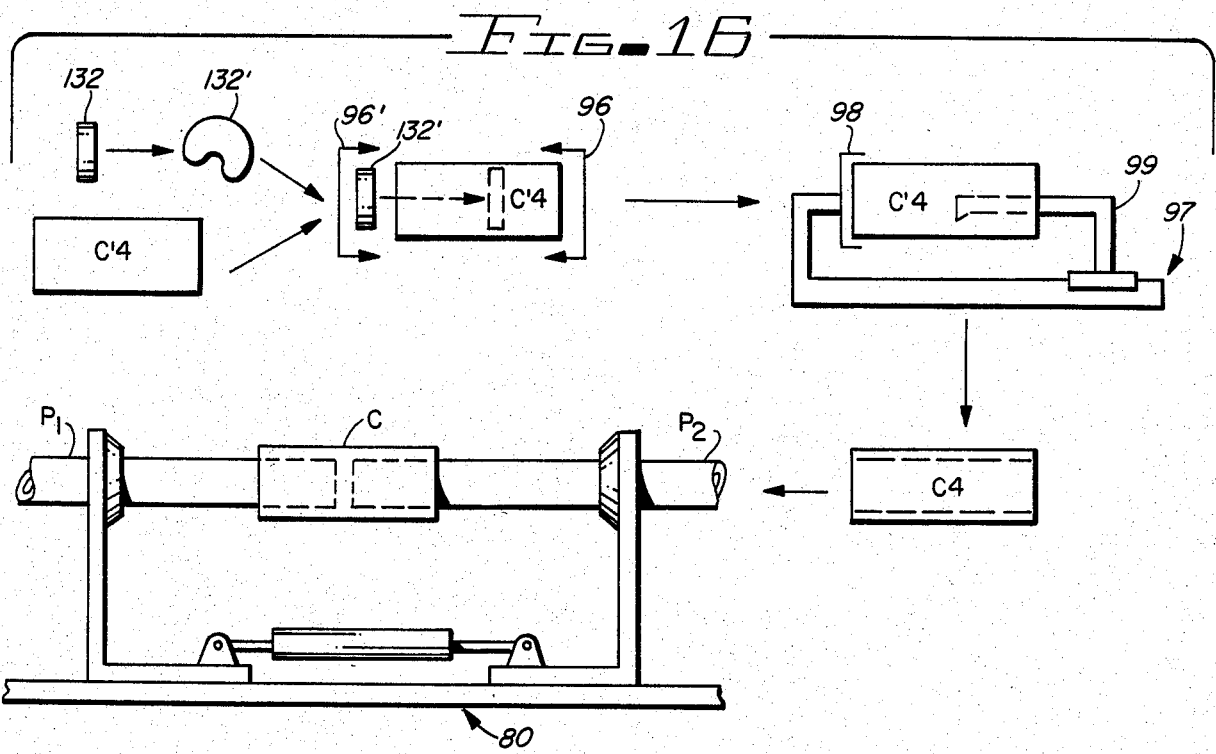
FIG. 16 a flow sheet which diagrammatically sets forth another method of the present invention.

FIG. 16 illustrates the method by which the embodiment of FIG. 13 is fabricated, and by which a pipeline is constructed. The plastic cylinder 132 of FIG. 15 is deformed at 132'. Next, as seen illustrated by numerals 96 and 96', the seal 132' is assembled into the groove 26. Numerals 96 and 96' can be one's hands. The coupling is then placed in a hollow spindle lathe 97, chucked up at 98, and tool apparatus 99 then is employed to form a continuous or discontinuous multiplicity of threads at 22' and 34', with the thread commencing at the outer socket 20 (not shown) and extending all the way up to the shoulder or abutment 28. The resultant configuration of the cutter blades and seal teeth are illustrated on the left hand side of FIG. 13. In FIG. 16, the completed coupling is used for joining the confronting marginal ends of pipes P1 and P2 together by utilizing a pipe building machine 80 in the above described manner, and as shown in my above mentioned previously issued patents.

Figure 17:
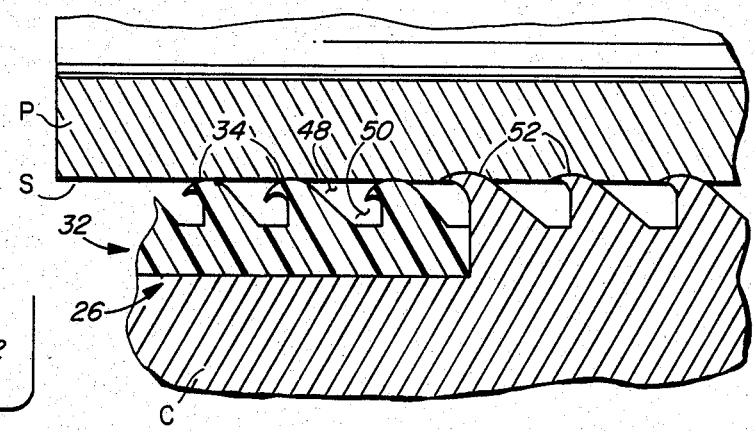
FIG. 17 is a fragmentary, enlarged, detailed, cross-sectional view of part of the apparatus disclosed in FIG. 13.

FIG. 17 illustrates an isolated, fragmentary view of part of a pipeline which has been built in accordance with the present invention, and particularly illustrates a coupling member such as illustrated in FIG. 13. As seen in FIG. 17, the coupling C has been joined to the marginal end of a pipe P. The cutter blades 52 have been compressed and deformed and embedded into the surface S of the pipe as seen illustrated at 52. The individual sealing teeth 34 of the seal member 32 have been compressed and deformed by the pipe surface S and are resiliently biased towards the inside terminal end of the pipe P, and therefore present a configuration which advantageously seals the coupling and pipe against leakage with tremendous forces and unexpected favorable results. Numerals 48 and 50 indicate annular, circumferentially extending voids, formed between the sealing teeth and the outer periphery S of the pipe. The voids 48 and 50 can be changed geometrically in configuration by changing the pitch, configuration, and relative size of the seal teeth.

In FIG. 18, the coupling C5 is provided with an annular central land 30, with there being diametrically opposed, continuous cutter blades formed along the inner surface thereof. The original cylindrical bore 88 is tapered as seen at 90, and the cutter blades are then formed to a depth 92, in order to form the continuous blades from the outer socket 20 to the land 30. A plastic coating 94, which can be applied in accordance with FIG. 12, is applied to the entire inside peripheral surface of the pipe coupling.

The embodiment of FIG. 19 illustrates the preferred form of an offshore coupling C6. The coupling C6 is provided with an elongated central socket 21 spaced from an inner socket 24, with the cutter blades 22 being interposed therebetween. Outer socket 20 is formed between the central socket 21 and the terminal end 18 of the coupling.

In FIG. 19, the outer socket 20 enables the pipe ends to more readily be aligned along the axial centerline of the coupling. As the pipe end is telescopingly forced into abutting engagement with shoulder 28, the sockets 21 and 24 cause a limited marginal area of the pipe surface adjacent thereto to enlarge. These spaced enlargements are effected within the cutter blade area 22 and the seal area 26.

When making up an offshore pipeline utilizing the coupling C6, the work is usually carried out on board a sea going vessel, or a barge; and, consequently, as the made-up pipeline bends and descends from the barge and again bends as it descends onto the bottom of the ocean, considerable strain is effected at the central sockets 21, 21', due to the bending moments induced thereinto. The central sockets extend over a considerable distance of the coupling interior and thereby transfer the bending loads directly into the main body of the coupling, rather than injuring the rigid connection effected by the cutter blades 22.

I claim:

1. Method of building a pipeline by joining the marginal ends of adjacent pipe joints to opposed sockets of a pipe coupling, comprising the steps of:
   (1) selecting a pipe which has a constant diameter marginal end;
   (2) making a coupling member by forming an axial bore into a sleeve member such that the inside diameter of the bore is smaller than the outside diameter of the marginal end of the pipe;
   (3) forming circumferentially extending cutter blades about a first marginal length of the inside wall surface of the bore; and, forming a circumferentially extending seal receiving groove along a second marginal length of the inside wall surface of said bore; making said groove with an inside diameter which is larger than the outside diameter of the marginal end of the pipe; placing an annular resilient seal member within said groove; making said seal member with an inside diameter which is smaller than the outside diameter of the marginal end of the pipe;

(4) inclining the cutter blades towards a medial part of the pipe sleeve and in a direction away from the marginal end of the pipe which is to be forced thereinto;

(5) making said seal receiving groove extend along the axial center line of the coupling from a location beginning at the termination of the cutter blades and extending the groove to a location adjacent to a medial part of the bore so that the groove is formed inwardly of the cutter blades; forming seal teeth on the inner circumferentially extending surface of said seal member and orienting the seal teeth towards the geometrical center of the coupling; with the seal teeth and the cutter blades being substantially uninterrupted and being continuous from the outermost end of the cutter blades to the innermost end of the seal teeth;

(6) arranging the constant diameter marginal end of the pipe in facing relationship to one end of the coupling member, with the longitudinal central axis of the pipe and coupling member coinciding with one another; and, (7) applying sufficient force to the pipe and coupling member to force the marginal end of the pipe to move into the axial bore, whereupon, the surfaces between the marginal end of the pipe and the interior of the coupling member are deformed due to the difference in the size of the inside diameter of the cutter blades, the annular seal member, and the outside diameter of the pipe; thereby sealingly holding the marginal end of the pipe within the axial bore of the coupling with great friction due to the close tolerance fit therebetween.

2. The method of claim 1 wherein step (3) is carried out by selecting the relative size of the cutter blades and pipe such that the force effected in step (7) causes the cutter blades and pipe surface to be deformed at least 0.010 inches.

3. Method of building a pipeline by joining the marginal ends of adjacent pipe joints to opposed sockets of a pipe coupling, comprising the steps of:

(1) selecting a pipe which has a constant diameter marginal end;

(2) making a coupling member by selecting a sleeve member and forming an axial bore into the sleeve member such that the inside diameter of the bore is smaller than the outside diameter of the marginal end of the pipe;

(3) forming circumferentially extending cutter blades about opposed marginal lengths of the inside wall surface of the bore; and, forming only one circumferentially extending seal receiving groove between said marginal lengths of said bore; imparting said groove with a diameter which is larger than the outside diameter of said marginal end of said pipe; placing an annular plastic seal member within said groove; imparting said plastic seal member with an inside diameter which is smaller than the outside diameter of said marginal end of the pipe;

(4) inclining the cutter blades towards a medial part of the pipe sleeve and in a direction away from the marginal end of the piep which is to be forced thereinto;

(5) said one seal receiving groove extends on opposing sides of the geometrical center of the coupling along the axial centerline of the coupling and is located between the innermost terminal ends of the opposed cutter blades, placing said seal member within said groove; forming seal elements on the inner peripheral wall surface of the seal member; and orienting the seal elements of the seal member towards the geometrical center of the coupling;

(6) arranging the constant diameter marginal end of the pipe in facing relationship to one end of the pipe coupling, with the longitudinal central axis of the pipe and coupling coinciding with one another; and, (7) applying sufficient force to the pipe and coupling to force the marginal end of the pipe to move into the axial bore, whereupon the surfaces between the marginal end of the pipe and the interior of the pipe coupling are deformed due to the difference in the size of the inside diameter of the cutter blades, the annular seal member, and the outside diameter of the pipe; thereby sealingly holding the marginal end of the pipe within the axial bore of the coupling with great friction due to the close tolerance fit therebetween.

4. The method of claim 3 wherein step (3) is carried out by selecting the relative size of the cutter blades and pipe such that the force effected in step (7) causes the cutter blades and pipe surface to be deformed at least 0.010 inches.

5. Method of building a pipeline by forcing the marginal ends of adjacent pipe joints into opposed sockets formed within a pipe coupling, comprising the steps of:

(1) selecting a pipe which has a substantially constant diameter marginal end;

(2) making a pipe coupling by selecting a pipe sleeve which has a greater outside diameter respective to the outside diameter of the marginal end of the pipe to be joined thereto; and, forming an axial bore into the pipe sleeve wherein the inside diameter of the axial bore is slightly smaller than the outside diameter of the marginal end of the pipe;

(3) forming circumferentially extending cutter blades about a first marginal length of the inside wall surface of the axial bore; inclining the cutter blades toward a medial part of the pipe sleeve and in a direction away from the end of the pipe to be joined thereto;

(4) making the inside diameter of the cutter blades 0.020–0.080 inches smaller than the outside diameter of the marginal end of the pipe to be joined thereto; forming a circumferentially extending annular groove within a second marginal length of the inside wall surface of the axial bore; making said seal receiving groove extend from a location beginning at the termination of the cutter blades and extending the groove axially along the axial bore to a location adjacent to a medial part of the axial bore;

(5) forming said seal receiving annular groove along the axial centerline of the coupling at a location which is inwardly of said cutter blades;

(6) forming a resilient cylindrical seal member and placing said seal member within said annular groove; making the inside diameter of said seal member smaller than the outside diameter of said marginal end of said pipe, forming seal elements on the inner peripheral wall surface of said seal member, and orienting said seal elements towards the geometrical center of said coupling; so that the marginal end of said pipe is subsequently held in sealed relationship within the axial bore with great friction due to the close tolerance fit between the seal elements and the outer surface of the pipe to be received therewithin;

(7) forming said seal elements on the inner circumferentially extending surface of said seal member; with the seal elements and the cutter blades cooperating together to form a substantially uninterrupted seal and cutter surface which is continuous from the outermost end of the cutter blades to the innermost end of the seal elements;

(8) arranging the constant diameter marginal end of a pipe in facing relationship respective to one end of the pipe coupling, with the longitudinal central axis of the pipe and coupling coinciding with one another;

(9) forcing the marginal end of the pipe to move into the socket by applying sufficient force to move the pipe and coupling relative to one another, whereupon the surface between the marginal end of the pipe and the pipe coupling is deformed due to the difference in the inside diameter of the cutter blades and the outside diameter of the pipe.

6. The method of claim 5 wherein step (3) is carried out by selecting the relative size of the cutter blades and pipe such that the force effected in step (9) causes the cutter blades and pipe surface to be deformed at least 0.010 inches.

7. Method of building a pipeline by joining the marginal ends of adjacent pipe joints to opposed sockets formed within a pipe coupling, comprising the steps of:

(1) selecting a pipe which has a constant diameter marginal end;

(2) making a pipe coupling having an outside diameter which is greater than the outside diameter of the marginal end of the pipe; and, forming an axial bore into the pipe coupling such that the inside diameter of the axial bore is slightly smaller than the outside diameter of the marginal end of the pipe;

(3) forming circumferentially extending cutter blades on opposed marginal lengths of the inside wall surface of the pipe coupling; inclining the cutter blades toward a medial part of the pipe coupling and in a direction away from the end of the pipe to be joined thereto;

(4) making the inside diameter of the cutter blades smaller than the outside diameter of the marginal end of the pipe;

(5) forming only one seal receiving circumferentially extending annular groove within the coupling and positioning the annular groove medially of the coupling inwardly of said cutter blades, making said annular groove extend between the innermost terminal ends of the opposed cutter blades;

(6) forming a resilient cylindrical seal member and placing said seal member within said annular groove; making the inside diameter of said seal member smaller than the outside diameter of said marginal end of said pipe; forming seal teeth on the inner peripheral wall surface of said seal member, and orienting said seal teeth towards the geometrical center of said coupling;

(7) arranging the constant diameter marginal end of a pipe in facing relationship respective to one end of the pipe coupling; with the longitudinal central axis of the pipe and coupling coinciding with one another;

(8) forcing the marginal end of the pipe to move into the axial bore by applying sufficient force to move the pipe and coupling towards one another, whereupon the contact surface between the marginal end of the pipe and the pipe coupling is deformed due to the difference in the inside diameter of the cutter blades, the seal member, and the outside diameter of the pipe; so that the marginal end of said pipe is held within the axial bore of the pipe coupling with great friction due to the close tolerance fit therebetween.

8. The method of claim 7 wherein step (3) is carried out by selecting the relative size of the cutter blades and pipe such that the force effected in step (8) causes the cutter blades and pipe surface to be deformed at least 0.010 inches.

9. A connector device for use in building pipelines by joining one constant diameter marginal end of a pipe to a marginal end of another pipe by said connector device;

said connector device has an axial passageway formed therethrough, a marginal length of said axial passageway is made into a pipe receiving socket;

a marginal length of said passageway includes circumferentially extending cutter blades which are of an inside diameter which is smaller than the constant diameter marginal end of a pipe to be joined into a pipeline by said connector device;

said cutter blades are in the form of a plurality of circumferentially extending blade members which are increased in thickness in a direction radially away from the longitudinal axial centerline of the connector device, said blades are inclined towards a medial part of the connector device and in a direction away from the pipe end to be received therewithin;

a circumferentially extending groove formed within said passageway at a location spaced from one end of said socket; a deformable annular seal member received within said groove, said seal member has an inside diameter which is less than the outside diameter of the marginal pipe end to be received therein; said seal receiving groove is formed from a location adjacent to the cutter blades to a location at the medial part of the bore; seal means formed on the inside surface of said seal member, said seal means and said cutter blades being substantially uninterrupted and continuous from the outermost end of the blades to the innermost end of the seal means, so that when the pipe end is forced into the connector device, the cutter blades and seal means are deformed and tightly engage the marginal pipe end.

10. The connector device of claim 9 wherein the relative size of the cutter blades and pipe outer surface is such that when the pipe end is forced into the coupling, the cutter blades and pipe surface are deformed at least 0.010 inches.

11. The connector device of claim 10 wherein said seal receiving groove is located inwardly of said cutter blades, said seal means including seal teeth formed on the inside diameter of said seal member, said seal teeth are oriented towards the geometrical center of said connector device.

12. A connector device for use in building pipelines by joining one constant diameter marginal end of a pipe to a marginal end of another pipe by said connector device;

said connector device has an axial passageway formed therethrough, opposed marginal lengths of said axial passageway are made into opposed pipe receiving sockets;

a marginal length of said sockets include continuous circumferentially extending cutter blades which are of an inside diameter which is smaller than the constant diameter marginal end of a pipe to be joined into a pipeline by said connector device;

said cutter blades are in the form of a plurality of circumferentially extending blade members which are increased in thickness in a direction radially away from the longitudinal axial centerline of the connector device, said blades are inclined towards a medial part of the connector device and in a direction away from the pipe end to be received therewithin; said cutter blades are located at opposed marginal ends within the connector device;

there being one circumferentially extending seal receiving groove which extends on opposing sides of the geometrical center of the coupling between the innermost terminal ends of the opposed cutter blades, a deformable annular seal member received within said groove, said seal member is made complementary respective to said groove, and a plurality of seal elements are formed on the inner peripheral wall of said seal member;

said seal member has an inside diameter which is less than the ouside diameter of the marginal pipe end to be received therein;

so that when the pipe end is forced into the connector device, the cutter blades and seal member elements are deformed and tightly engage the marginal pipe end.

13. The connector device of claim 12 wherein the relative size of the cutter blades and pipe are made such that the force effected in joining the pipe to the coupling device causes the cutter blades and pipe surface to be deformed at least 0.010 inches.

* * * * *

UNITED STATES PATENT AND TRADEMARK OFFICE
CERTIFICATE OF CORRECTION

PATENT NO.   : 4,527,820

DATED        : JULY 9, 1985

INVENTOR(S)  : JACK E. GIBSON

It is certified that error appears in the above-identified patent and that said Letters Patent is hereby corrected as shown below:

In the title substitute --POSITIVE-- for "POSTIVE";

Column 3, line 65, insert --22'-- after "22,";

Column 4, line 8, substitute --abutment-- for "abut ment";

Column 9, line 65, correct the spelling of "pipe".

Signed and Sealed this

Twenty-ninth Day of October 1985

[SEAL]

Attest:

DONALD J. QUIGG

Attesting Officer

Commissioner of Patents and Trademarks—Designate